(12) United States Patent
Chen et al.

(10) Patent No.: US 7,522,337 B2
(45) Date of Patent: Apr. 21, 2009

(54) COMPACT MULTI-ENTRANCE-PUPIL IMAGING OPTICAL SYSTEM

(75) Inventors: Chungte W. Chen, Irvine, CA (US); J. Steve Anderson, Santa Monica, CA (US)

(73) Assignee: Raytheon Company, Waltham, MA (US)

( * ) Notice: Subject to any disclaimer, the term of this patent is extended or adjusted under 35 U.S.C. 154(b) by 592 days.

(21) Appl. No.: 10/866,476

(22) Filed: Jun. 10, 2004

(65) Prior Publication Data

US 2005/0275940 A1    Dec. 15, 2005

(51) Int. Cl.
G02B 23/24    (2006.01)
(52) U.S. Cl. .................................. 359/434; 359/399
(58) Field of Classification Search .............. 359/399, 359/434
See application file for complete search history.

(56) References Cited

U.S. PATENT DOCUMENTS

| | | | |
|---|---|---|---|
| 3,948,660 A | 4/1976 | Deml et al. | |
| 4,708,436 A | 11/1987 | Kleinknecht | |
| 4,953,964 A * | 9/1990 | Anafi et al. | 359/419 |
| 5,059,008 A | 10/1991 | Flood et al. | |
| 5,074,646 A | 12/1991 | Huang et al. | |
| 5,351,151 A * | 9/1994 | Levy | 359/240 |
| 5,734,190 A | 3/1998 | Hawkins et al. | |
| 6,254,237 B1 | 7/2001 | Booth | |
| 6,509,812 B2 | 1/2003 | Sayyah | |
| 6,650,802 B1 | 11/2003 | Morse et al. | |
| 7,009,764 B1 * | 3/2006 | Sigler et al. | 359/434 |
| 2005/0176134 A1 * | 8/2005 | Grier et al. | 435/287.2 |

* cited by examiner

*Primary Examiner*—Joshua L Pritchett
(74) *Attorney, Agent, or Firm*—Leonard A. Alkov

(57) ABSTRACT

An imaging optical system includes a subtelescope array, with at least two subtelescopes, each having a single entrance pupil and an exit light beam. Each subtelescope has an optical pointing axis, and the pointing axes for the subtelescopes are parallel. An imager forms an image from the exit light beams at an image surface, where there is a sensor such as a focal plane array. Preferably, a phase shifter array includes a phase shifter for each of the subtelescopes. The phase shifter array receives the exit light beam of each of the subtelescopes and has a capability to adjust the phase of at least one of the exit light beams. The imager receives the phase-shifted exit light beams.

14 Claims, 5 Drawing Sheets

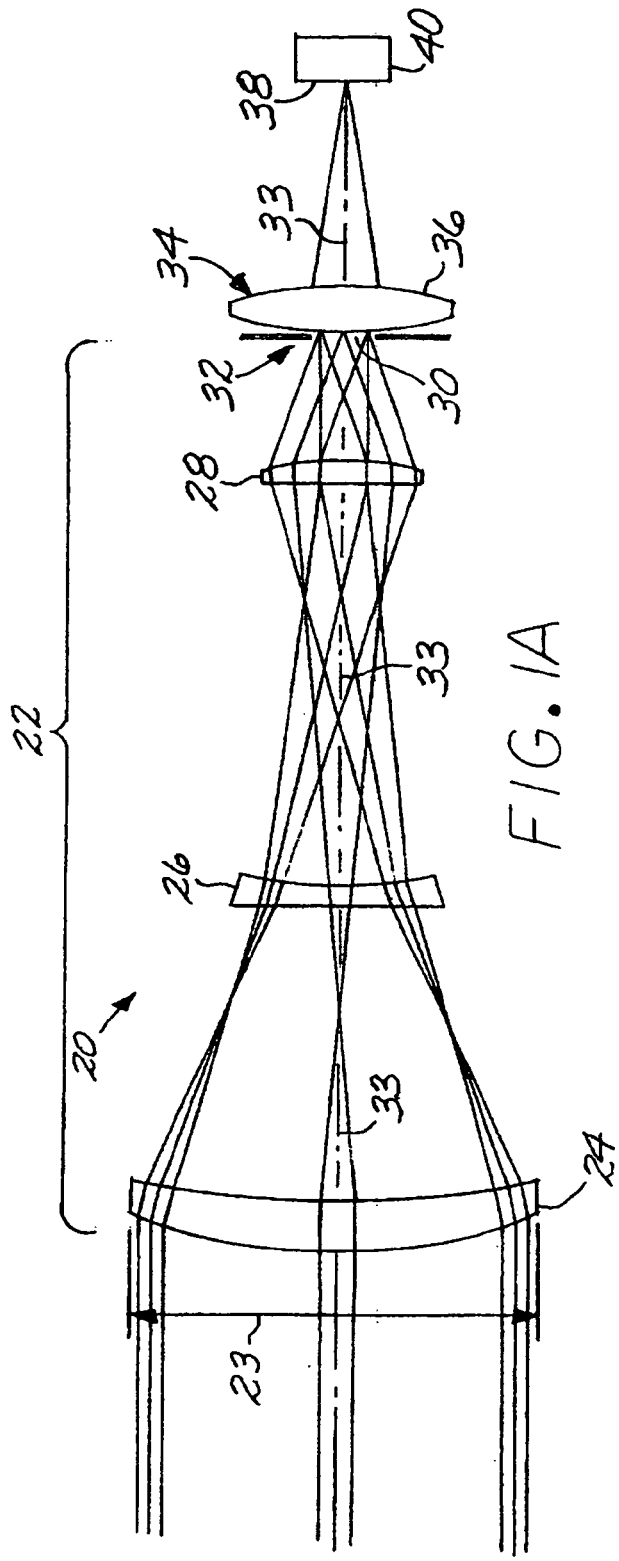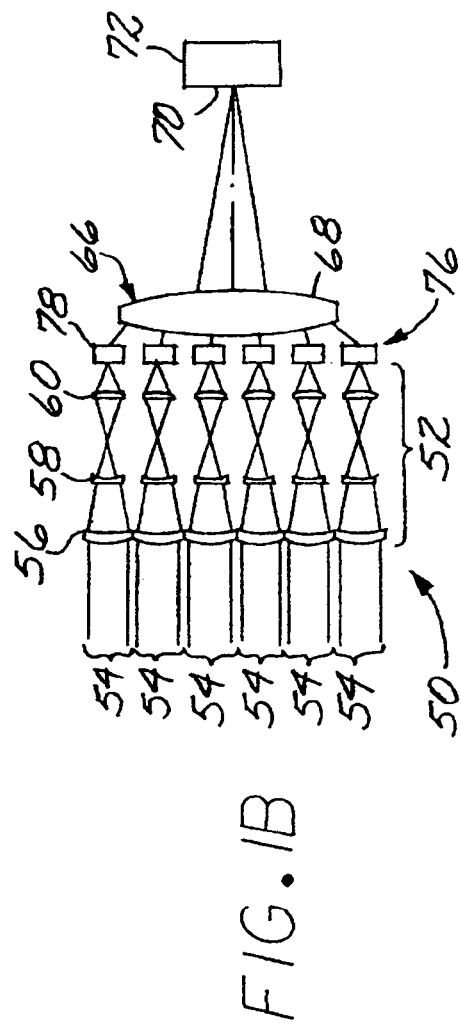
FIG. 1A
FIG. 1B

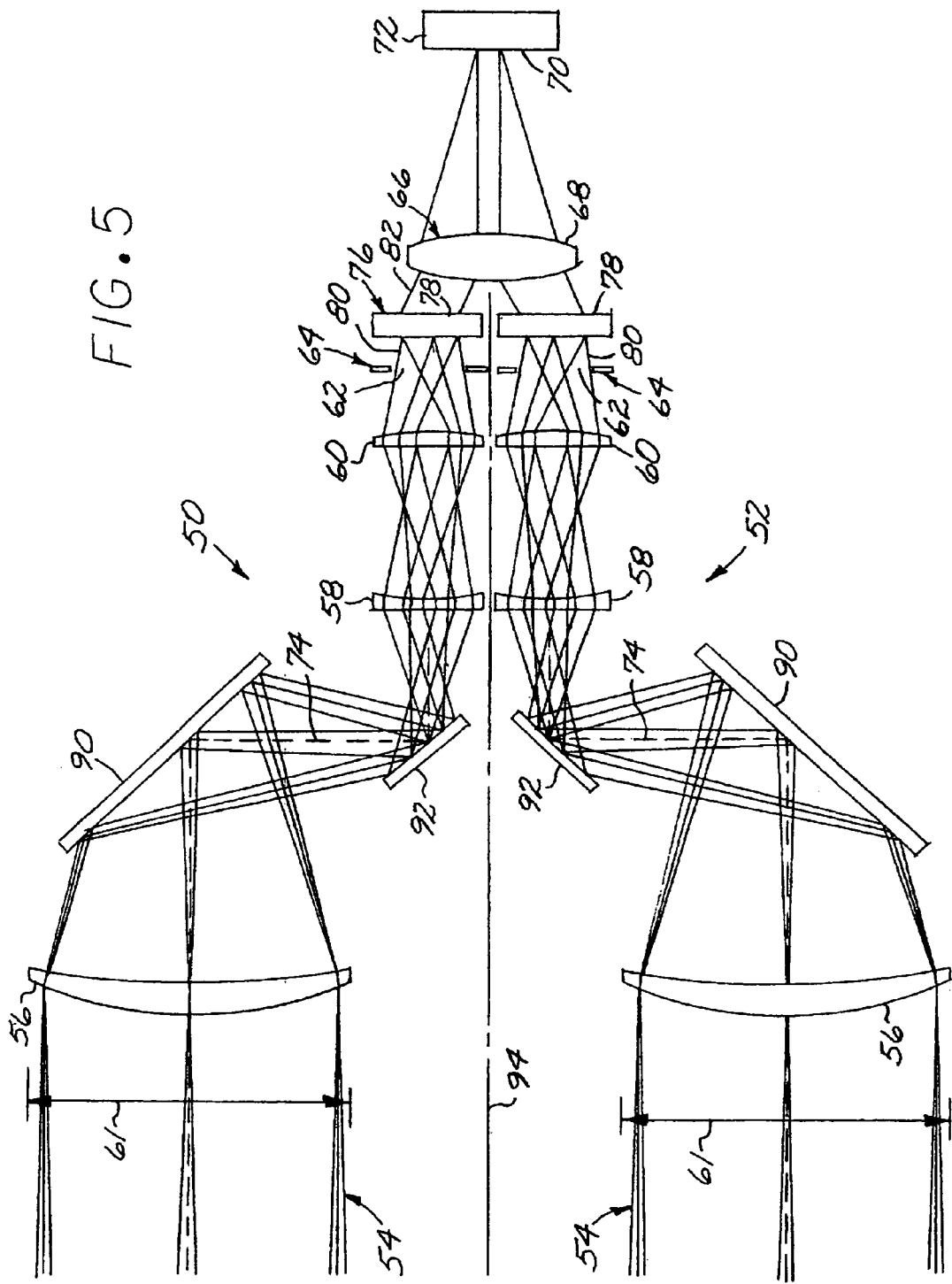

COMPACT MULTI-ENTRANCE-PUPIL IMAGING OPTICAL SYSTEM

This invention relates to a light-imaging optical system and, more particularly, to a compact imaging system utilizing a multi-telescope array.

BACKGROUND OF THE INVENTION

In a typical telescope, a number of lenses and/or mirrors are arranged along a light path to gather and focus light rays onto an image surface The image size and character may be describe in part in terms of an entrance pupil (sometimes termed "pupil" herein) at the entrance aperture, the telescope magnification, and imager behind the telescope to focus the light. The optical components are enclosed in a package structure that supports and aligns the optical components, and protects them from damage. One goal of the design of many imaging optical systems is to obtain satisfactory optical performance in as small a volume, in as short a physical length, and with as low a total weight, as possible. The physical length, of the package is particularly important for many applications, which can have tight physical length limitations.

In most cases, the physical length of the imaging optical system is several times the diameter of the entrance pupil. To reduce the physical length, and thence the volume and weight of the imaging optical system, the lenses and/or mirrors may have higher optical power (i.e., greater curvatures), and an associated greater numerical aperture, as compared with more-conventional lenses and/or mirrors. Such higher optical power lenses and their imaging optical systems are therefore more sensitive to fabrication and alignment errors. The production yield of such components and systems is typically relatively low, and costs are therefore higher, when using the higher-optical-power lenses and/or mirrors to achieve a compact imaging optical system.

There is a need for a compact imaging optical system that achieves good optical performance with reduced physical length, volume, and weight as compared with the known imaging optical systems, but does not require the use of high-optical-power lenses and/or mirrors with their associated high production costs. The present invention fulfills this need, and further provides related advantages.

SUMMARY OF THE INVENTION

The present approach provides a compact imaging optical system that achieves a large effective entrance pupil and image size, with a small physical length, volume, and weight. The optical light-gathering ability of the imaging optical system is equal to that of much longer imaging optical systems. The optical performance in terms of higher-order aberrations is improved as compared with larger imaging optical systems. The lenses and/or mirrors of the imaging optical system of the present approach are small in diameter and of low optical power in most cases, reducing their fabrication costs and the cost of the imaging optical system as compared with larger, higher-optical power lenses and/or mirrors. The present approach relates to imaging optical systems, as distinct from nonimaging optical systems.

In accordance with the invention, an imaging optical system comprises a subtelescope array including at least two subtelescopes, with each subtelescope having its own entrance pupil and its own exit light beam. Each subtelescope has an optical pointing axis that is parallel to the pointing axes for the other subtelescope(s). An imager forms an image of the exit light beams at an image surface, and there is a sensor at the image surface. The imager is preferably at least one lens module or mirror module, and more preferably exactly one lens module or one mirror module that serves all of the subtelescopes, regardless of the number of subtelescopes. The sensor is preferably a focal plane array selected according to the wavelength of the light to be imaged, such as ultraviolet, visible, or infrared light.

Preferably, the subtelescopes are substantially identical to each other and are stationary with respect to each other. In one embodiment, each of the subtelescopes is a refractive subtelescope having at least two optically powered lenses therein. Each of the subtelescopes may include one or more flat fold mirrors in the optical path. The subtelescopes may be arranged in a hexagonal array when viewed in a direction parallel to the pointing axes.

The diameter of the entrance pupil size of each of the subtelescopes is less than about one-half of the diameter of the entrance pupil size of an equivalent large, monolithic, single-entrance-pupil telescope. As used here, "equivalent" means that the total entrance pupil area of the monolithic, single-entrance-pupil telescope is equal to the sum of the entrance pupil areas of the subtelescopes in the multi-entrance-pupil subtelescope array. However, the total light-collecting power of the array of subtelescopes is equal to or greater than that of the equivalent monolithic large telescope.

It is highly desirable that the exit light beam of each subtelescope be coherently combined, so that the image quality (expressed in terms of the point-spread function) of the subtelescope array can be close to that of the monolithic large telescope. To accomplish the coherent combination of the light beams, a phase shifter array includes a phase shifter for each of the subtelescopes. Each phase shifter array receives the exit light beam of each of the subtelescopes and has a capability to adjust the phase of at least one of the exit light beams. Where the phase shifter array is present, the imager receives the phase-shifted exit light beams. The phase shifter may be, for example, a microelectromechanical system (MEMS) phase shifter or a liquid crystal phase shifter.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 1A and 1B are schematic illustrations of a size comparison between an optical system with a single-entrance-pupil telescope (FIG. 1A) and an optical system with a multi-entrance-pupil subtelescope array (FIG. 1B);

FIG. 5 is a sectional view of the six-subtelescope array of FIG. 3, taken on line 4-4, for a second embodiment of the phase shifter array using a liquid crystal phase shifter.

DETAILED DESCRIPTION OF THE INVENTION

Figure 2:
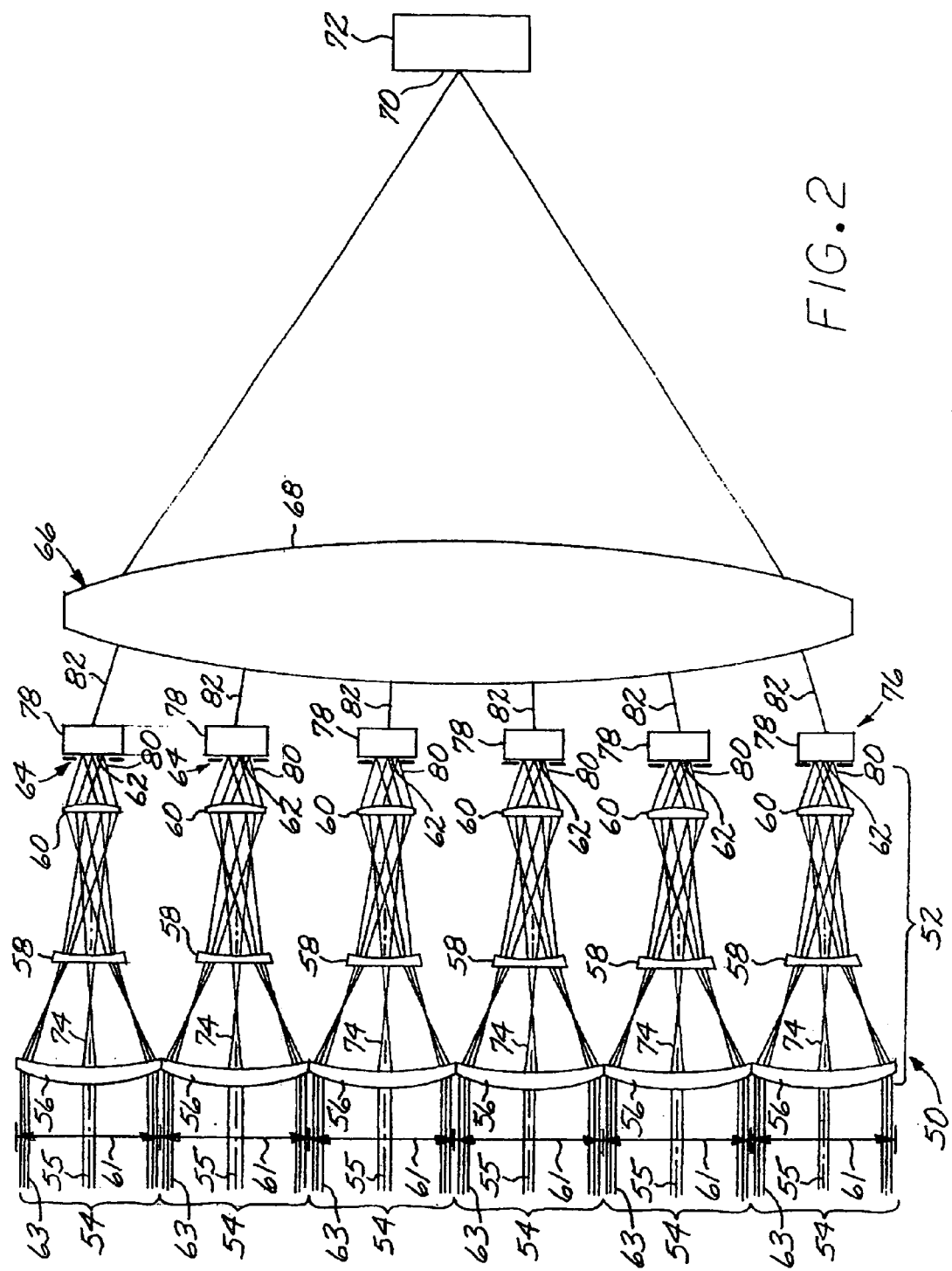
FIG. 2 is an enlargement of FIG. 1B, illustrating the multi-entrance-pupil imaging optical system in greater detail.

FIGS. 1A and 1B show the structures of, and a size comparison between, a single-entrance-pupil monolithic telescope in an imaging optical system (FIG. 1A) and a multi-entrance-pupil subtelescope array in an imaging optical system (FIG. 1B). FIG. 1A depicts, for comparison with the approach of the present invention, a single-entrance-pupil, monolithic imaging optical system 20 having a single-entrance-pupil, monolithic telescope 22 with a single entrance pupil 23, in this case a refractive telescope including three optically powered lenses 24, 26, and 28. An exit pupil 30 is at an exit aperture 32 of the single-entrance-pupil telescope 22. The light energy passing through the exit pupil 30 is imaged by an imager 34, represented by a lens 36, to a focal surface 38. There is a sensor 40, in this case a focal plane array sensor, at the focal surface 38. In this single-entrance-pupil telescope 22, all light that reaches the sensor 40 travels on a single optical path 33 through the single entrance pupil 23, each of the three lenses 24, 26, and 28, the exit pupil 30, and the imager 34 before reaching the sensor 40. By "single-entrance-pupil telescope" is meant a telescope having a single optical path 33 that passes through the single entrance pupil 23. The physical length of the single-entrance-pupil telescope 22 is a multiple M of the diameter of the entrance pupil 23, where M is determined by the nature and spacings of the lenses 24, 26, and 28.

FIG. 1B depicts a multi-entrance-pupil imaging optical system 50 having a multi-entrance-pupil subtelescope array 52 formed of at least two subtelescopes 54, which is a preferred embodiment within the scope of the present invention. FIG. 2 is an enlargement of FIG. 1B illustrating the multi-entrance-pupil imaging optical system 50 in greater detail. In the illustrated case, there are six subtelescopes 54, although there may be more or fewer subtelescopes 54. Each of the subtelescopes 54 has an optical pointing axis 55, and all of the optical pointing axes 55 are parallel to each other. Each of the subtelescopes 54 is preferably a refractive subtelescope 54 that includes at least two optically powered lenses, or it may be a reflective subtelescope with optically powered mirrors, or a hybrid with both optically powered lenses and optically powered mirrors. In the illustration each of the refractive subtelescopes 54 includes three optically powered lenses 56, 58, and 60. Each of the subtelescopes 54 has exactly one entrance pupil 61 where an entry light beam 63 enters the lens 56, and exactly one exit pupil 62 at an exit aperture 64. For each of the subtelescopes 54, an exit light beam 80 leaving the exit pupil 62 is imaged by an imager 66, represented by a lens 68, to an image surface 70. The imager 66 may include an imaging lens module or an imaging mirror module, or a combination of lenses and mirrors. In each of the subtelescopes 54, there is a sensor 72, in this case a focal plane array (FPA) sensor 72, at the image surface 70. The sensor 72 may be of any type and operable in any selected wavelength, such as ultraviolet, visible, or infrared wavelengths. Preferably, there is exactly one (i.e., a single) imager 66 and exactly one (i.e., a single) sensor 72, regardless of the number of subtelescopes 54. In this multi-entrance-pupil subtelescope array 52, light that reaches the sensor 72 may travel on any of the optical paths 74 through any of the subtelescopes 54, and through the imager 66 before reaching the sensor 72. By "multi-entrance-pupil subtelescope array" is meant a subtelescope array having two or more subtelescopes, wherein each subtelescope has its own optical path 74 and its own entrance pupil 61.

Because the light beam reaching the sensor 72 follows different optical paths 74 in the different subtelescopes 54, for most applications care must be taken that the light reaching the sensor 72 along the different optical paths 74 is coherent. A degree of noncoherency between the light traveling on the different optical paths 74 may arise because of dimensional tolerances of the lenses and/or mirrors, and their spacings and orientations, in the individual subtelescopes 54, and possibly for other reasons. If the light reaching the sensor 72 along the different optical paths 74 through the different subtelescopes 54 is consequently not coherent, the different light beams may non-constructively interfere with each other, producing a loss of resolution as evidenced by a broadened point spread function.

For those applications where the light traveling along the different optical paths 74 through the different subtelescopes 54 must be coherent for good resolution or for other reasons, the multi-entrance-pupil subtelescope array 52 preferably includes a phase shifter array 76 including a separate phase shifter 78 for each of the optical paths 74 of each of the respective subtelescopes 54. That is, there is typically a separate phase shifter 78 for each of the subtelescopes 54. The phase shifter array 76 receives the exit light beam 80 of each of the subtelescopes 54 before the exit light beam 80 reaches the sensor 72, and has a capability to adjust the phase of at least one of the exit light beams 80. (That is, the phase shifters 78 are positioned on the optical path 74 between the respective subtelescopes 54 and the sensor 72, and preferably between the respective subtelescopes 54 and the imager 66.) A phase shifter output light beam 82 for each of the subtelescopes 54 is the same as the exit light beam 80 of each of the subtelescopes 54, except that the phase-shifter output light beam 82 may have its phase adjusted by the phase shifter 78 relative to the exit light beam 80. The structure and function of the phase shifter array 76 will be discussed in further detail subsequently.

The physical length of each of the subtelescope 54 is the same multiple M of the diameter of its entrance pupil 61, as is the monolithic telescope 20, in the illustrated embodiment. In this illustrated embodiment, each of the entrance pupils 61 has the same diameter, and therefore each of the subtelescopes 54 has the same physical length so that the subtelescopes 54 are substantially identical to each other. Because the diameters of the individual entrance pupils 61 of the respective subtelescopes 54 of FIGS. 1B and 2 are much smaller than the diameter of the entrance pupil 23 of the equivalent single-entrance-pupil monolithic telescope 22 of FIG. 1A, the physical length of the each of the subtelescopes 54, and thence the multi-entrance-pupil subtelescope array 52, is also much smaller than the physical length of the single-entrance-pupil telescope 22. Typically, each of the subtelescopes 54 has a physical length of less than about one-half of that of an equivalent monolithic telescope 22. As used here, "equivalent" means that the total entrance pupil area of the monolithic, single-entrance-pupil telescope 22 is equal to the sum of the entrance pupil areas of the subtelescopes 54 in the multi-entrance-pupil subtelescope array 52, for purposes of making the comparison. The drawings of FIGS. 1-5 are not to scale, except that the relative physical lengths of the single-entrance-pupil telescope 22 of FIG. 1A and the multi-entrance-pupil subtelescope array 52 of FIG. 1B are in the correct scale to illustrate the much smaller size of the multi-entrance-pupil subtelescope array 52. The single-entrance-pupil telescope 22 of FIG. 1A is not within the scope of the present invention, while the multi-entrance-pupil subtelescope array 52 of FIG. 1B is within the scope of the present invention.

In practice, the subtelescopes 54 may not be arrayed linearly with equal spacings as schematically depicted in FIG.

1B. For example, the subtelescopes 54 may be arranged in either an irregular pattern with different spacings between different subtelescopes, in a nonlinear array, or in a hexagonal pattern.

In the former arrangement wherein the subtelescopes 54 are irregularly spaced apart, the multi-entrance-pupil optical system 50 may be optimized at a particular high spatial frequency resolution at the expense of low spatial frequency resolution. An example of such an arrangement would be as depicted for the subtelescope array 52 of FIGS. 1B and 2, wherein only the first, third, and sixth subtelescopes 54 from the top were present and operating, and the others were missing or not operable. The image resolution at wavelength $\lambda$ associated with each pair of subtelescopes is expressed as $2.44\lambda(D+d)$, where D is the centerline spacing between the optical pointing axes 55 of the pair of subtelescopes 54, and d is the diameter of the entrance pupil 61 of the subtelescope 54. Increasing the spacing D of any pair of subtelescopes increases their image resolution, as long as the phase shifter array 76 is present and operating to ensure that the light reaching the sensor 72 is coherent. If an array of subtelescopes has irregular spacings of the subtelescopes 54 of the subtelescope array 52, the image may be optimized at several spatial frequencies.

Figure 3:
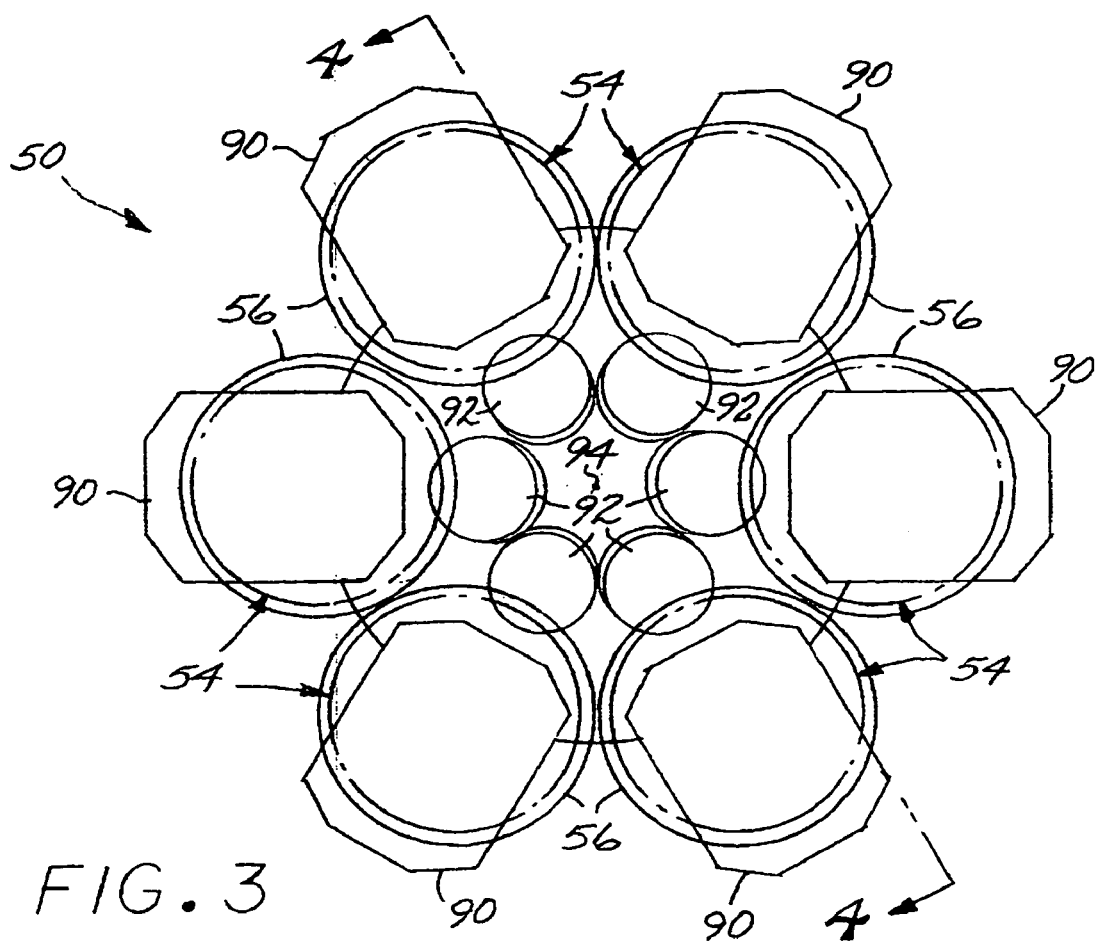
FIG. 3 is a schematic illustration of an optical system with a six-subtelescope hexagonal array, viewed parallel to the pointing axes of the subtelescopes.
Figure 4:
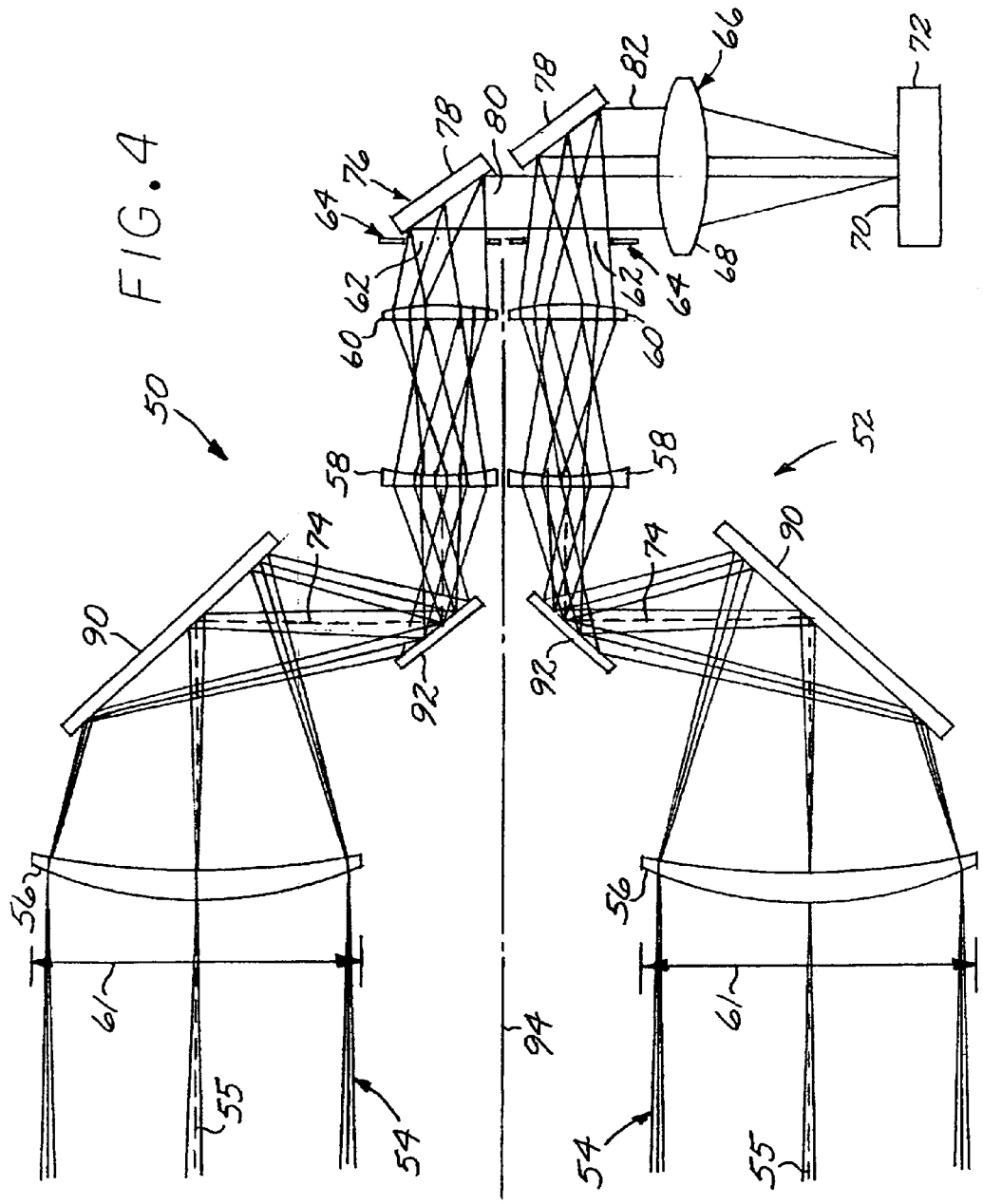
FIG. 4 is a sectional view of the six-subtelescope array of FIG. 3, taken on line 4-4, for a first embodiment of the phase shifter array using a MEMS phase shifter.

FIG. 3 illustrates one preferred arrangement for six subtelescopes 54, arrayed in a hexagonal pattern when viewed parallel to the optical pointing axis 55. This hexagonal pattern allows the exit light beams 80 to be easily conveyed to the sensor 72. FIGS. 4 and 5 are sectional views illustrating two embodiments of the arrangement of the elements of the multi-entrance-pupil imaging optical system 50 for each of two of the subtelescopes 54. The following description applies to both of the embodiments of FIGS. 4 and 5, except as indicated. The prior discussion of FIGS. 1B, 2, and 3 is incorporated here.

In FIGS. 4-5, a pair of flat mirrors 90 and 92 are used to fold the optical paths 74 of each of the subtelescopes 54 from the radial positions of the first lenses 56 to nearer a centerline 94 (that is parallel to the optical pointing axes 55) of the multi-entrance-pupil subtelescope array 52. This folding of the optical paths 74 is necessitated by the relatively large diameters of the first lenses 56 of each of the subtelescopes 54. The fold mirrors 90 and 92 also shorten the external package lengths of the subtelescopes 54 measured parallel to the optical pointing axes 55.

In the embodiment of FIG. 4, the phase shifter array 76 includes a separate microelectromechanical system (MEMS) phase shifter 78 for each of the subtelescopes 54. MEMS phase shifters 78 are known in the art for other applications. The phase shifting is accomplished by reflection of the light beam on the optical path 74 from the MEMS phase shifters 78. The phase shifters 78 may be either adjusted a single time for the optical system and fixed in the adjustment position, or they may include an active control with a feedback controller. When looking at either a point source or an extended object, the phase shifters 78 may be adjusted to obtain the sharpest image.

In the embodiment of FIG. 5, the phase shifter array 76 includes a separate liquid crystal phase shifter (LCPS) 78 for each of the subtelescopes 54. Liquid crystal phase shifters 78 are known in the art for other applications. The phase shifting is accomplished by passage of the light beam on the optical path 74 through the liquid crystal phase shifters 78. As with the MEMS phase shifters of FIG. 4, the liquid crystal phase shifters 78 may be either adjusted a single time for the optical system and fixed in the adjustment position, or they may include an active control with a feedback controller. When looking at either a point source or an extended object, the phase shifters 78 may be adjusted to obtain the sharpest image.

Figure 6:
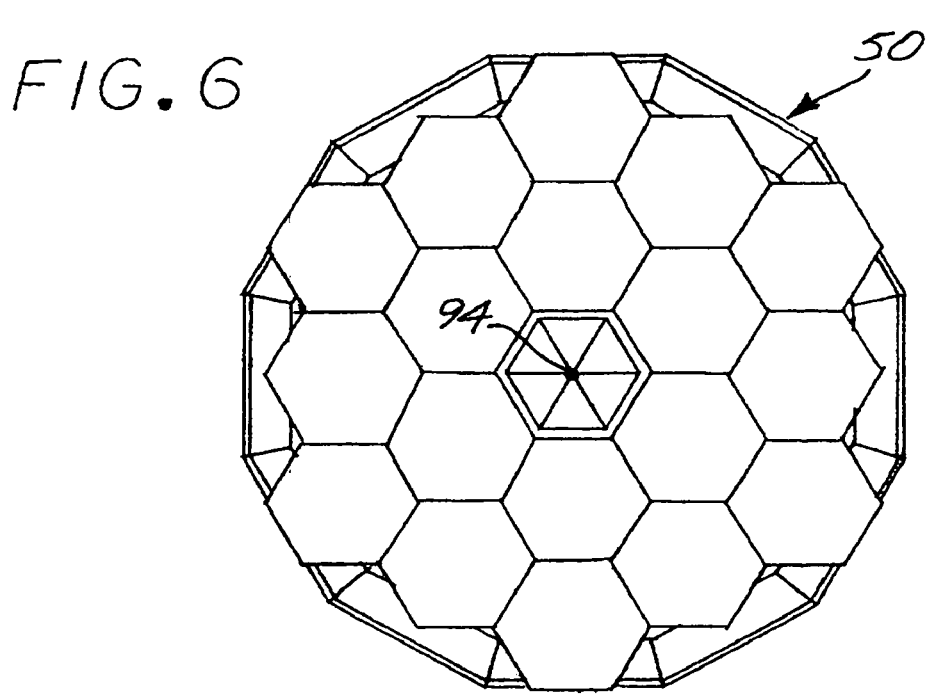
FIG. 6 is a schematic illustration of an optical system with an eighteen-subtelescope hexagonal array, viewed parallel to the pointing axes of the subtelescopes.

The hexagonal arrangement of the subtelescopes 54, as depicted in FIG. 3, is not limited to the use of six subtelescopes 54. FIG. 6 illustrates an arrangement of eighteen subtelescopes 54, with six subtelescopes 54 in a first radial group spaced from the centerline of the subtelescope array, and twelve subtelescopes 54 in a second radial group spaced from the centerline of the subtelescope array. Fewer or more subtelescopes 54 may be used.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An imaging optical system comprising:
    a subtelescope array including at least two subtelescopes each having a single entrance pupil and an exit light beam. wherein each subtelescopes has an optical pointing axis, and wherein the pointing axes for the subtelescopes are parallel, wherein each of the subtelescopes has a physical length of less than about one-half of that of an equivalent monolithic telescope;
    exactly one imager that forms an image of the exit light beams of all of the subtelescopes at an image surface, wherein the imager is formed of lenses, mirrors, or a combination of lenses and mirrors; and
    a sensor at the image surface.

2. The imaging optical system of claim 1, wherein the subtelescopes are stationary with respect to each other.

3. The imaging optical system of claim 1, wherein the subtelescopes are substantially identical to each other.

4. The imaging optical system of claim 1, wherein the at least two subtelescopes comprise a hexagonal array of subtelescopes when viewed in a direction parallel to the pointing axes.

5. The imaging optical system of claim 1, wherein each of the subtelescopes is a refractive subtelescope having at least two optically powered lenses therein.

6. The imaging optical system of claim 1, wherein each of the subtelescopes is a refractive subtelescope having at least two optically powered lenses therein, and wherein each of the subtelescopes further includes at least one flat fold mirror.

7. The imaging optical system of claim 1, wherein the imager comprises an imaging lens module or an imaging mirror module.

8. The imaging optical system of claim 1, where there is exactly one sensor.

9. The imaging optical system of claim 1, wherein the sensor is an infrared sensor or a visible-light sensor.

10. The imaging optical system of claim 1, further including
    a phase shifter array including a phase shifter for each of the subtelescopes, wherein the phase shifter array receives the exit light beam of each of the subtelescopes and has a capability to adjust the phase of at least one of the exit light beams, and wherein the imager receives the phase-shifted exit light beams.

11. The imaging optical system of claim 10, wherein the phase shifter array includes a MEMS phase shifter.

12. The imaging optical system of claim 10, wherein the phase shifter array includes a liquid crystal phase shifter.

13. An imaging optical system comprising:

a subtelescope array including at least two subtelescopes each having a single entrance pupil and an exit light beam, wherein each subtelescope has an optical pointing axis, wherein the pointing axes (by the subtelescopes are parallel, and wherein each of the subtelescopes has a physical length of less than about one-half of that of an equivalent monolithic telescope;

a phase shifter array including a phase shifter for each of the subtelescopes, wherein the phase shifter array receives the exit light beam of each of the subtelescopew and has a capability to adjust the phase of at least one of the exit light beams, and wherein the phase shifter array has a phase shifter output;

a single imager that forms an image from the phase shifter outputs at an image plane; and a single sensor at the image plane.

14. An imaging optical system comprising:

a subtelescope array including at least two subtelescopes each having a single entrance pupil and an exit light beam, wherein each subtelescope has an optical pointing axis and wherein the pointing axes for the subtelescopes are parallel, and wherein each of the subtelescopes has a physical length of less than about one-half of that of an equivalent monolithic telescope;

an imager that forms an image of the exit light beams at an image surface; and a sensor at the image surface.

* * * * *